United States Patent [19]
Spisak et al.

[11] 3,723,794
[45] Mar. 27, 1973

[54] RECTIFIER ASSEMBLY FOR BRUSHLESS EXCITATION SYSTEMS

[75] Inventors: Andrew J. Spisak, Bethel Park; Louis E. Nagoda, Irwin, both of Pa.

[73] Assignee: Westinghouse Electric Corporation, Pittsburgh, Pa.

[22] Filed: Mar. 6, 1972

[21] Appl. No.: 232,084

[52] U.S. Cl. ................................. 310/68 D, 310/72
[51] Int. Cl. ............................................. H02k 11/00
[58] Field of Search ................ 310/68, 68 A–68 D, 310/71, 72, 165

[56] References Cited

UNITED STATES PATENTS

| | | | |
|---|---|---|---|
| 3,354,330 | 11/1967 | Storsand | 310/68 R |
| 3,359,438 | 12/1967 | Hylen | 310/68 R |
| 3,363,122 | 1/1968 | Hoover et al. | 310/68 R |
| 3,371,235 | 2/1968 | Hoover | 310/68 R |
| 3,457,440 | 7/1969 | Horsley | 310/68 R |
| 3,590,291 | 6/1971 | Spisak et al. | 310/68 D |

FOREIGN PATENTS OR APPLICATIONS 1,473,610   2/1967   France.............................310/68 D

*Primary Examiner*—D. F. Duggan
*Attorney*—A. T. Stratton et al.

[57] ABSTRACT

A rectifier assembly for brushless excitation systems in which rectifier diodes are mounted on support wheels on a shaft, and in which the wheels form part of the rectifier circuit and are connected to axial output leads in a shaft bore by radial connecting members extending through the hub of each wheel and through the shaft to the axial leads.

4 Claims, 4 Drawing Figures

Patented March 27, 1973  3,723,794

RECTIFIER ASSEMBLY FOR BRUSHLESS EXCITATION SYSTEMS

BACKGROUND OF THE INVENTION

The present invention relates to brushless excitation systems for alternating current generators, and more particularly to an improved construction and arrangement of a rotating rectifier assembly for such excitation systems.

Brushless excitation systems are now widely used for supplying direct current field excitation to large alternating current generators. Such an excitation system includes an alternating current exciter having a stationary field structure and a rotating armature member. A rotating rectifier assembly is carried on a common shaft with the exciter armature and connected thereto to provide a direct current output. The output of the rectifier is supplied to the field winding of the main generator which also rotates with the exciter armature and rectifier. In this way an excitation system is provided which requires no commutator or slip rings and no sliding contacts.

The rectifier assembly for such an excitation system usually comprises a considerable number of semiconductor diodes and associated devices, such as resistors and fuses, all mounted on supporting wheels carried on the shaft. The diodes and other components must of course be mounted in such a manner that they are adequately supported against the high rotational forces to which they are subjected during operation, and they must also be mounted as compactly as possible. One suitable arrangement which has been extensively used is shown in Hoover U.S. Pat. No. 3,371,235. In this arrangement, two support wheels are provided each having a longitudinally extending rim portion and the wheels are mounted on the shaft in back-to-back relation and insulated from the shaft. The diodes and associated components are mounted on the internal cylindrical surfaces of the wheel rims to be adequately supported thereby, and they are connected to the exciter armature winding and to the rims in such a manner that the rim portions of the wheels themselves form the positive and negative output buses of the rectifier circuit. The direct current output thus provided is conducted to the main generator field winding by means of longitudinal leads disposed in a central axial bore in the shaft.

In the construction of the Hoover patent, the wheels are connected to the longitudinal field leads by means of radial connectors which are axially spaced from the wheels and connected thereto by longitudinal conductors. This requires both axial and radial space, which is undesirable as the entire assembly must be made as compact as possible, and the longitudinal conductors are relatively long so that an expensive laminated construction is necessary to provide sufficient flexibility to accommodate thermal expansion of the conductors. The long conductors must also have adequate support against rotational forces which requires additional space and expensive supporting means. One of the longitudinal conductors must extend through the wheel nearest the radial connectors for connection to the more remote wheel, and this requires windows or openings in the wheels for the conductors to pass through, which adds to the expense and manufacturing difficulty of the wheels. Thus, although the structure of the Hoover patent is in general satisfactory, the lead arrangements require an undesirably large amount of space, which is at a premium in these rotating rectifier assemblies, and also involve a relatively expensive construction.

SUMMARY OF THE INVENTION

The present invention provides a construction for a rotating rectifier assembly generally of the type disclosed in the above-mentioned Hoover patent, but in which each rectifier wheel is connected to one of the axial leads by a simple radical stud or connector extending directly through the hub of the wheel and through the shaft into the axial lead to connect the wheel to its corresponding lead. Thus no longitudinal connectors are required between the wheels and the radial connectors, and a minimum of axial space is required. Preferably, the radial connectors are made in two parts so as to minimize the radial space required for assembly and removal and in this way a very compact assembly is provided which minimizes the overall space requirements and materially reduces the cost and difficulty of construction.

BRIEF DESCRIPTION OF THE DRAWING

The invention will be more fully understood from the following detailed description, taken in connection with the accompanying drawing, in which.

DESCRIPTION OF THE PREFERRED EMBODIMENT

Figure 1:
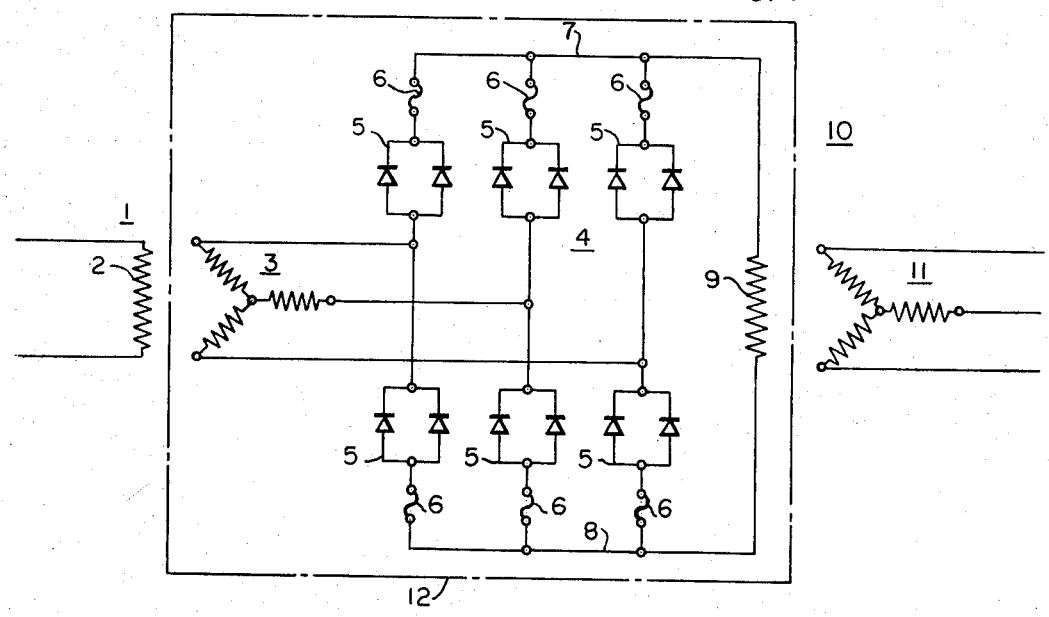
FIG. 1 is a simplified schematic diagram of a typical brushless excitation system.

As indicated above the present invention is directed to a rotating rectifier assembly for brushless excitation systems. Such a system, as shown in the schematic diagram of FIG. 1, includes an alternating current exciter 1 having a field winding 2 carried on a stationary field structure and supplied with direct current excitation from any suitable source. The exciter 1 also has an armature winding 3, shown as a three-phase winding, which is carried on a rotatable armature structure and connected to a rotatable rectifier assembly generally indicated at 4. The rectifier assembly 4 is shown as a three-phase rectifier bridge having a rectifier sub-assembly or module 5 in each leg of the bridge. Each rectifier module 5 is shown as including two rectifier diodes in parallel and a fuse 6, although it will be understood that more than two diodes would usually be utilized in each leg of the bridge. The upper group of rectifier modules 5 is connected to a direct current output bus 7, and the lower group is similarly connected to an output bus 8. The buses 7 and 8 are connected to supply direct current excitation to the field winding 9 of a main synchronous generator 10 which has a stationary armature winding 11. The exciter armature 3, the rectifier assembly 4, and the generator field winding 9 are all carried on a common rotating assembly as indicated at 12, either being mounted on a common shaft or carried on shafts which are coupled together. Thus direct electrical connections are made between the elements of the system and no brushes or sliding contacts are required.

Figure 2:
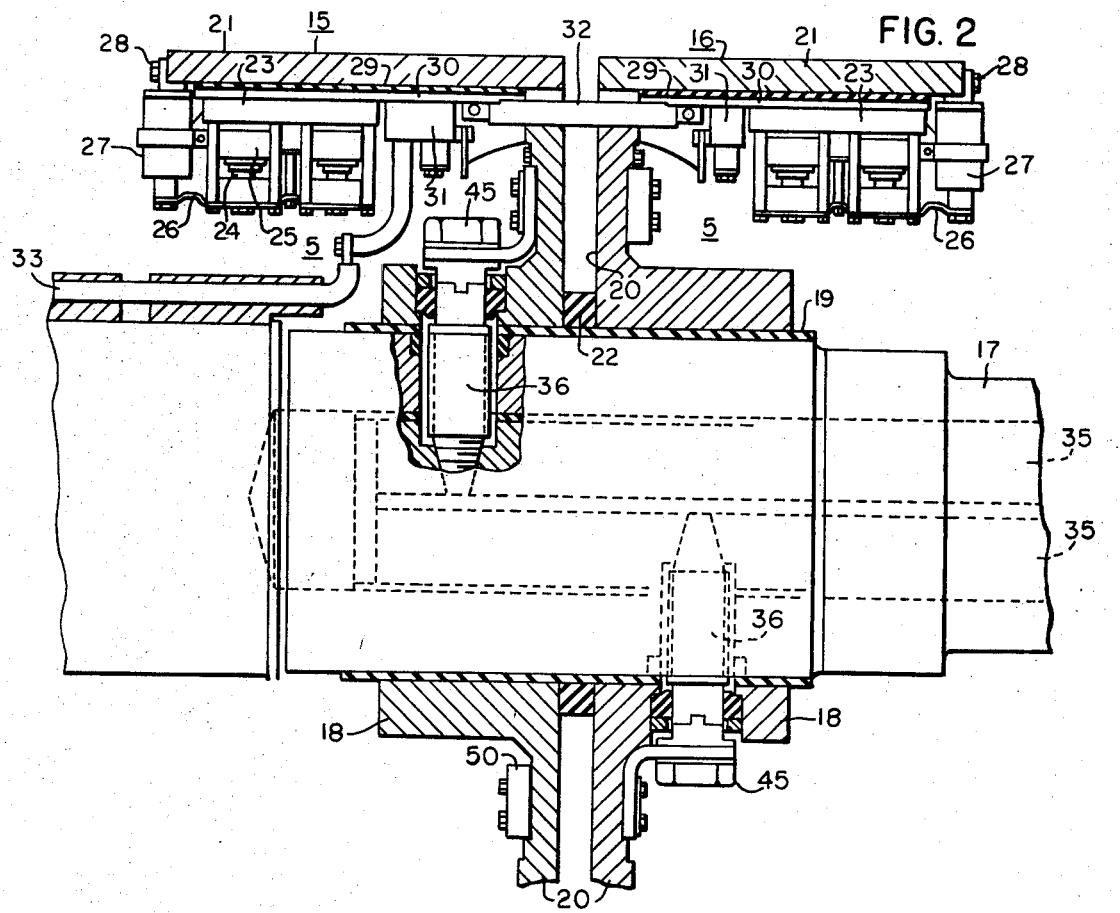
FIG. 2 is a longitudinal sectional view of a rotating rectifier assembly embodying the present invention.

As previously indicated, the present invention relates to the construction of the rotating rectifier assembly 4. FIG. 2 shows a longitudinal sectional view of a preferred embodiment of the invention. As there shown, two rectifier wheels 15 and 16 are provided and mounted on a shaft 17. The two wheels 15 and 16 are of similar construction and each wheel includes a hub portion 18 which engages the shaft 17 but is insulated from it by a layer of suitable insulating material as indicated at 19. Each wheel also has a radial flange portion 20 which may be integral with the hub portion 18, and a longitudinally extending rim 21 which is generally cylindrical in configuration and which extends axially in one direction from the radial flange 20. The two wheels 15 and 16 are mounted on the shaft 17 in back-to-back relation as shown, that is, the rims 21 extend in opposite directions, and the wheels are preferably separated by an insulating spacer 22.

The rectifier sub-assemblies 5 are mounted on the internal cylindrical surfaces of the wheels rims 21. Any desired number and type of circuit components may be utilized, and they may be arranged and connected in any suitable manner. As shown, the assemblies 5 are of the modular type more fully described and claimed in a copending application of A. J. Spisak et al., Ser. No. 232,085, filed Mar. 6, 1972 and assigned to the assignee of this invention. As more fully described in that application, each module 5 includes a conducting base 23 which may be hollow to contain capacitors, or other circuit elements, and which carries the diode assemblies themselves and is mounted on the inner surface of the rim 21. Each diode assembly includes a diode 24 of the pressure contact or disc type mounted between two conductive heat sinks 25. Two such assemblies are mounted on each base 23 and connected by a conducting strap 26 to each other and to a fuse 27 attached to a lug on the end of the base 23. The fuse 27 is mechanically and electrically connected to the rim 21 by a bolt 28 or in any other desired manner. The base 23 is insulated from the wheel 21 by a layer of insulation 29 and is connected by a conductor 30 to a terminal member 31. Corresponding terminals 31 on the wheels 15 and 16 are connected together by conductors 32 extending longitudinally through openings in the flanges 20 of both wheels. Leads 33 from the armature of the AC exciter extend along the shaft 17 and are connected to the terminals 31 of the wheel 15. The rectifier modules 5 on both wheels 15 and 16 are identical except that the polarities of the diodes 24 are reversed with respect to each other on the two wheels, and it will be seen that results in a three-phase bridge connection, as shown in FIG. 1, with the rims 21 of the two diode wheels serving as the output buses designated 7 and 8 in FIG. 1. Any necessary voltage dividing resistors or capacitors for suppressing transient voltages, or other desired circuit elements, may of course be included in the assembly.

The direct current output of the rectifier assembly is the exciting current for the field winding 9 of the main generator, and in accordance with usual practice is connected to the field winding by means of axial leads 35 extending longitudinally in a central axial bore of the shaft 17. The leads 35 are suitably insulated from the shaft and from each other and constitute the output leads of the excitation system. To complete the rectifier circuit each of the wheels 15 and 16 must be electrically connected to one of the axial leads 35.

Figure 3:
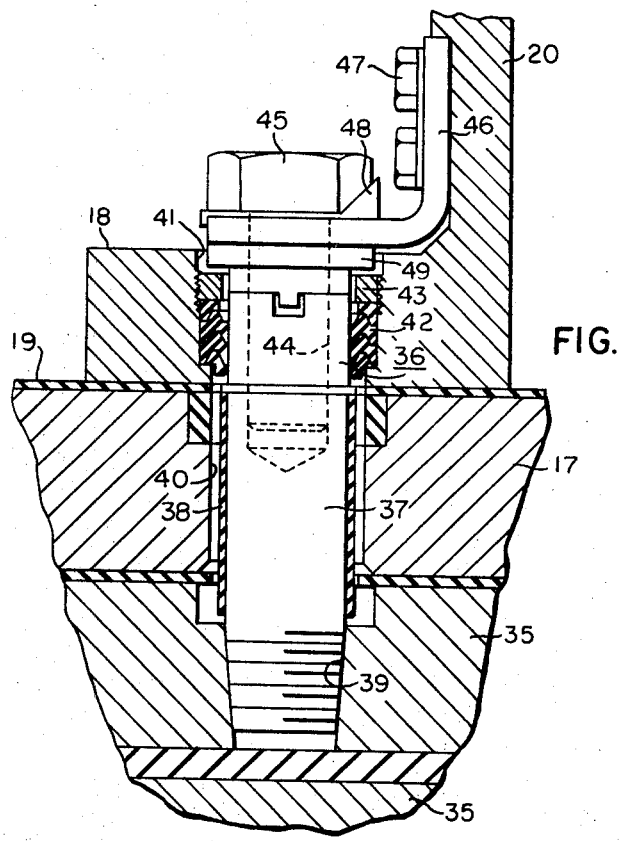
FIG. 3 is a sectional view on a larger scale showing one of the radial connectors utilized in the assembly of FIG. 2.

In accordance with the present invention, this connection is made by means of radial connectors 36 shown more clearly in FIG. 3. As there shown, the connector 36 comprises a radial stud member 37 which is suitably insulated as indicated at 38 and which is threaded at 39 to engage an internally threaded opening in the lead 35 to make electrical connection therewith. The threaded stud 37 extends upwardly through a radial opening 40 in the shaft and through a corresponding radial opening 41 in the hub portion 18 of the diode wheel 15 or 16. The stud 37 preferably extends only part way through the hub 18 and, if desired, a seal 42 can be provided between the hub 18 and the upper part of the stud 37 and held in place by a threaded ring 43. If the type of cooling utilized for the main leads 35 does not require a seal, the seal 42 can of course be omitted.

The stud 37 has an internally threaded axial opening 44 at its upper end to receive a bolt 45 which is threaded into the opening 44. Electrical connection between the diode wheel and the radial connector 36 is made by means of a heavy copper strap connector 46 which is attached to the flange portion 20 of the wheel by bolts 47, and which is clamped to the connector 36 by the bolt 45, a lock plate 48 preferably being provided to prevent loosening of the bolt. If desired or necessary a conducting spacer 49 may be provided between the top of the stud 37 and the connector 46. A balance weight 50 (FIG. 2) is preferably attached to each wheel diametrically opposite the connectors 36 and 46. The stud 37 and bolt 45 must be made of a material having high electrical conductivity because of the large field currents which must be carried, and they must have high mechanical strength because of the high rotational forces to which they are subjected. A zirconium copper alloy is preferred although any other suitable material having the necessary characteristics may be utilized.

Figure 4:
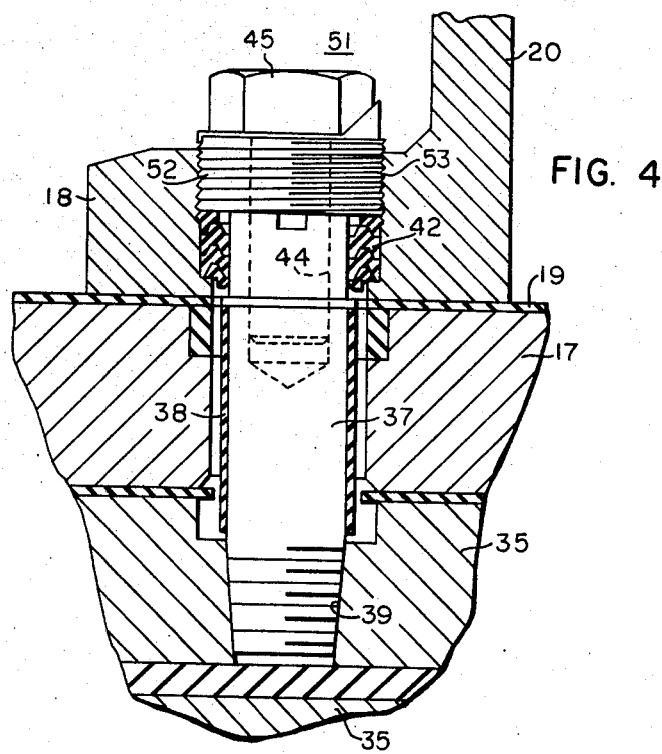
FIG. 4 is a similar sectional view showing a different type of radial connector suitable for use in the assembly of FIG. 2.

In some instances the connector 46 between the rectifier wheel and the radial connector may not be necessary and in such cases a radial connector 51 as shown in FIG. 4 may be utilized. As there shown, the connector 51 includes an insulated stud 37 as previously described which extends through the shaft 17 and is threaded into the lead 35. A seal 42 may also be provided if necessary. A conducting spacer 52 is provided and is externally threaded to engage in a threaded opening 53 in the hub portion 18 of the rectifier wheel. As before, the bolt 45 is threaded into an internally threaded recess 44 in the stud 37 and is tightened in place after the spacer 52 has been tightened to effect a solid electrical contact between the rectifier wheel and the connector 51. It will be seen that where a separate strap connector is not necessary, this type of radial connector provides effective electrical connection and such connection is further improved during operation because of the centrifugal force to which the connector is subjected which tends to increase the contact pressure.

It will now be apparent that a construction has been provided for the rotating rectifier assembly of a brushless excitation system in which a very compact arrangement is provided which requires a minimum of axial and radial space for the connections between the rectifier wheels and the axial output leads in the shaft, and in which no long connectors are required for this purpose which would require special support. The radial connectors utilized pass directly through the hub portions of the wheels so as to take a minimum of axial space, and the two-part construction of the radial connectors minimizes the amount of radial space which must be provided to permit assembly and removal of these connectors. Thus a very desirable and effective construction is provided which is very compact and relatively inexpensive as compared to constructions previously used.

I claim:

1. In a brushless excitation system including an alternating current exciter and rectifier means on a common shaft, said rectifier means comprising two rectifier wheels having hub portions engaging said shaft and insulated therefrom, each of said wheels also having a radial flange portion and a cylindrical rim portion extending in one direction from the flange portion, said wheels being supported on the shaft with their flange portions spaced apart and their rim portions extending in opposite directions, rectifier means supported on the internal surfaces of both rim portions, means for connecting the rectifier means to said exciter and to the respective rim portions in a rectifying circuit, a pair of longitudinal output leads axially disposed in a longitudinal bore in the shaft, said leads being insulated from the shaft and from each other, a connecting member extending radially through the hub portion of each of said wheels, each of said connecting members extending through the shaft into contact with one of said output leads and being insulated from the shaft, and each of said radial connecting members being in electrically conducting relation with the corresponding rectifier wheel.

2. The combination defined in claim 1 in which each of said radial connecting members comprises a first member extending through the shaft and engaging one of said output leads and a second member coaxially engaging the first member and extending through the hub portion of the rectifier wheel.

3. The combination defined in claim 2 and including an electrical connector attached to said wheel and engaging said radial connecting member to electrically connect the wheel thereto.

4. The combination defined in claim 2 and including a conducting spacer clamped between said first and second members, said spacer engaging the hub portion of said wheel to electrically connect the wheel to the radial connecting member.

* * * * *